United States Patent
Klosel et al.

(10) Patent No.: US 6,663,534 B2
(45) Date of Patent: Dec. 16, 2003

(54) PROCESS FOR PREVENTING OSCILLATING GEARSHIFTING IN AUTOMATIC MOTOR VEHICLE TRANSMISSIONS BY SUITABLE REDUCTION OF ENGINE TORQUE

(75) Inventors: Rainer Klosel, Langen (DE); Gotz Hangen, Wolfsheim (DE)

(73) Assignee: General Motors Corporation, Detroit, MI (US)

( * ) Notice: Subject to any disclaimer, the term of this patent is extended or adjusted under 35 U.S.C. 154(b) by 14 days.

(21) Appl. No.: 10/145,940

(22) Filed: May 15, 2002

(65) Prior Publication Data

US 2002/0193204 A1 Dec. 19, 2002

(30) Foreign Application Priority Data

Jun. 15, 2001 (DE) .......................................... 101 28 878

(51) Int. Cl.$^7$ ............................................... B60K 41/04
(52) U.S. Cl. ...................................................... 477/107
(58) Field of Search ................................ 477/107, 110, 477/128; 123/320

(56) References Cited

U.S. PATENT DOCUMENTS 5,241,476 A * 8/1993 Benford et al. .............. 701/58
5,568,748 A * 10/1996 Carlson et al. ........... 74/336 R
5,720,696 A * 2/1998 Robinson .................... 477/120
6,128,564 A * 10/2000 Graf ............................ 701/51

FOREIGN PATENT DOCUMENTS

| DE | 2929266 C2 | 5/1984 |
| DE | 4111645 A1 | 10/1992 |
| DE | 3830938 C2 | 11/1992 |
| DE | 19600914 A1 | 7/1997 |
| EP | 0962682 A2 | 12/1999 |
| EP | 0784170 B1 | 6/2000 |

* cited by examiner

*Primary Examiner*—Ankur Parekh
(74) *Attorney, Agent, or Firm*—Leslie C. Hodges

(57) ABSTRACT

A method for preventing oscillating gearshifts of a motor vehicle automatic transmission with electronic transmission control device is proposed with the following characteristics. The transmission control device monitors the current road resistance from a comparison of measured vehicle acceleration with a theoretical vehicle acceleration and determines therefrom the value of differential acceleration. The engine torque is reduced if: (a) the position of the accelerator pedal of the motor vehicle is greater than a first limit value; (b) the differential acceleration is greater than a second limit value; (c) the measured vehicle acceleration is greater than a positive third limit value; (d) the theoretical impingement in the next higher gear is lower than a fourth limit value; and (e) the current engine speed is greater than a fifth limit value.

2 Claims, No Drawings

PROCESS FOR PREVENTING OSCILLATING GEARSHIFTING IN AUTOMATIC MOTOR VEHICLE TRANSMISSIONS BY SUITABLE REDUCTION OF ENGINE TORQUE

TECHNICAL FIELD

The invention concerns a process for preventing oscillating shifting of the gears of a motor vehicle automatic transmission which is provided with an electronic transmission control device.

BACKGROUND OF THE INVENTION

In the context of certain road resistances (such as driving uphill with a trailer), oscillating gearshifts occur as a result of the fact that in a lower gear when driving under a full load the acceleration is always positive, while in the next higher gear the acceleration is always negative. After a shift which must be carried out in order to prevent the engine from exceeding its rated speed of rotation, the vehicle speed drops off again despite the full load until the hysteresis for downshifting has been exceeded.

From EP 0 784 170 B1 a process is known for controlling the upshifting process of the motor vehicle automatic transmission. It controls the upshifting or downshifting as a function of the throttle valve opening angle and the vehicle velocity by making use of stored upshifting characteristic lines or downshifting characteristic lines. After an upshifting characteristic line is exceeded by the actual operating point of the transmission control device before the initiation of an upshifting process, it checks whether a defined minimal acceleration is possible in the higher gear according to the momentary vehicle resistance calculated from the current values of the throttle valve opening angle, the engine speed, the engine torque, the vehicle speed, the gear ratio and the converter amplification degree without falling below the downshifting characteristic line. In the case of a negative test result, the upshifting process is suppressed, and in the case of a positive test result, the upshifting process is executed. In this case the defined minimal acceleration is stored in a control device as a magnitude coordinated with the vehicle velocity. Other procedures and devices for controlling the gearshifting process in a motor vehicle automatic transmission are known from DE 196 00 914 A1, DE 41 11 645 A1 and DE 38 30 938 C2.

SUMMARY OF THE INVENTION

It is an objective of the present invention to devise a different, especially simple process for preventing oscillating shifting in the automatic transmissions of motor vehicles.

DESCRIPTION OF THE PREFERRED EMBODIMENT

A process and system according to the present invention for preventing oscillating gearshifts of the automatic transmission of a motor vehicle with an electronic transmission control device has the following features:

the transmission control device monitors the current road resistance from a comparison of the measured vehicle acceleration $a_{ist}$ with a theoretical vehicle acceleration $a_{theor}$ and from this determines the value of the differential acceleration $a_{diff}$ the engine torque is reduced when
  (a) the position of the accelerator pedal of the motor vehicle is greater than a first limit value,
  (b) the differential acceleration $a_{diff}$ is greater than a second limit value,
  (c) the measured vehicle acceleration $a_{ist}$ is greater than a positive third limit value,
  (d) the theoretical acceleration or impingement $a_{theor}$ in the next higher gear is lower than a fourth limit value, and
  (e) the current engine speed is greater than a fifth limit value.

The transmission control device thus monitors the current road resistance from a comparison of the measured vehicle acceleration $a_{ist}$ with the theoretical vehicle acceleration preferably calculated back from the engine torque for driving on level ground and from it determines the value of the differential acceleration $a_{diff}$. The value of $a_{diff}$ can be either positive (in the context of a large road resistance, e.g., in the case of driving uphill) or negative (in the context of a low road resistance, e.g., when driving downhill). If the conditions stated above under (a) through (e) are satisfied, a reduction takes place, especially a gentle reduction of the engine torque. The result is that no additional vehicle acceleration occurs any longer, and the situation does not occur that the transmission is forced to shift up. Rather, because of the gentle reduction of the engine torque, the vehicle's speed remains constant at full load due to the regulation of the engine speed. One particular advantage of the process according to the present invention is therefore to be seen in the fact that instead of vehicle acceleration which would lead to a forced upshifting of the transmission, a reduction, especially a gentle reduction, of the engine torque takes place. Oscillating shifts can therefore be avoided at certain road resistances.

The reduction of the engine to a constant speed of rotation has the additional advantage that the thermal stress on the engine is lower.

The individual magnitudes for the above conditions specified under (a) through (e) are to be determined essentially in the individual case. Thus the condition (a), for example, can be regarded as satisfied if the angle of the accelerator pedal has reached approximately the value of 80% of its maximal angle. The limit value mentioned for condition (a) would therefore be about 80%. The characteristic values of the accelerations cannot be stated as a rule of thumb but rather they depend, for example, on the engine capacity, the load, and the velocity range. As a general rule, the limit values which are related to the acceleration are reproduced by characteristic lines. The condition (e), for example, can be regarded as satisfied if the present engine speed is greater than a limit value which, for example, amounts to 70% of the reducing speed of the engine.

What is claimed is:

1. A method for preventing oscillating gearshifts of a motor vehicle automatic transmission with electronic transmission control device, comprising the steps of:

monitoring the current road resistance from a comparison of measured vehicle acceleration ($a_{ist}$) with a theoretical vehicle acceleration ($a_{theor}$) and determining therefrom a value of differential acceleration ($a_{diff}$);

reducing engine torque if: (a) the position of the accelerator pedal of the motor vehicle is greater than a first limit value, (b) the differential acceleration ($a_{diff}$) is greater than a second limit value, (c) the measured vehicle acceleration ($a_{ist}$) is greater than a positive third limit value, (d) the theoretical acceleration ($a_{theor}$) in the next higher gear is lower than a fourth limit value, and (e) the current engine speed is greater than a fifth limit value.

2. A method according to claim 1 wherein the theoretical acceleration $a_{theor}$ constitutes the vehicle acceleration as calculated from the engine torque for driving on level ground.

\* \* \* \* \*